US011228363B2

(12) United States Patent
Sasaki et al.

(10) Patent No.: US 11,228,363 B2
(45) Date of Patent: *Jan. 18, 2022

(54) OAM MULTIPLEXING COMMUNICATION SYSTEM AND INTER-MODE INTERFERENCE ELIMINATION METHOD

(71) Applicant: NIPPON TELEGRAPH AND TELEPHONE CORPORATION, Tokyo (JP)

(72) Inventors: Hirofumi Sasaki, Yokosuka (JP); Hiroyuki Fukumoto, Yokosuka (JP); Doohwan Lee, Yokosuka (JP); Hiroyuki Shiba, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/650,376

(22) PCT Filed: Sep. 25, 2018

(86) PCT No.: PCT/JP2018/035535
§ 371 (c)(1),
(2) Date: Mar. 24, 2020

(87) PCT Pub. No.: WO2019/059406
PCT Pub. Date: Mar. 28, 2019

(65) Prior Publication Data
US 2020/0228195 A1 Jul. 16, 2020

(30) Foreign Application Priority Data

Sep. 25, 2017 (JP) .............................. JP2017-183847

(51) Int. Cl.
*H04W 16/28* (2009.01)
*H04B 7/204* (2006.01)
(Continued)

(52) U.S. Cl.
CPC ......... *H04B 7/2041* (2013.01); *H04L 5/0025* (2013.01); *H04L 25/0328* (2013.01); *H04L 25/03305* (2013.01)

(58) Field of Classification Search
CPC ... H04B 7/2041; H04B 7/0456; H04L 5/0025; H04L 25/0328; H04L 25/03305
See application file for complete search history.

(56) References Cited

U.S. PATENT DOCUMENTS 10,148,009 B2 12/2018 Klemes
10,224,641 B2 3/2019 Sundaram
(Continued)

FOREIGN PATENT DOCUMENTS

JP 2010136396 A 6/2010
JP 2011160458 A 8/2011
(Continued)

OTHER PUBLICATIONS

Orbital Angular Momentum-Based Communication with Partial Arc Sampling Receiving (Year: 2016).*
(Continued)

*Primary Examiner* — Dady Chery
(74) *Attorney, Agent, or Firm* — Harness, Dickey & Pierce, P.L.C.

(57) ABSTRACT

A transmitting station includes a plurality of transmitting weight multiplication units multiplying each of the transmission signal sequences by a transmitting weight, to be converted into $M_{TX}$ signals corresponding to UCAs forming an M-UCA so as to output the converted signals, and $M_{TX}$ transmitting OAM mode generation units inputting the sig-
(Continued)

nals corresponding to the UCAs and performing DFT on the input signals, so as to output to the corresponding UCA; and a receiving station includes $M_{RX}$ receiving OAM mode demultiplex units inputting signals from each of the UCAs forming the M-UCA and performing IDFT on the input signals, so as to output by each of received signal sequences, and a plurality of receiving weight multiplication units multiplying for each of them by a receiving weight, so as to demultiplex the spatially multiplexed received signal sequences and to output them in which interference between spatially multiplexed OAM modes is suppressed.

9 Claims, 9 Drawing Sheets

(51) Int. Cl.
*H04L 5/00* (2006.01)
*H04L 25/03* (2006.01)

(56) References Cited

U.S. PATENT DOCUMENTS

| | | | |
|---|---|---|---|
| 10,228,443 B2 | 3/2019 | Kulaib et al. | |
| 2003/0076274 A1* | 4/2003 | Phelan | H01Q 3/26 343/895 |
| 2003/0235255 A1 | 12/2003 | Ketchum et al. | |
| 2010/0135203 A1 | 6/2010 | Maru | |
| 2010/0172421 A1* | 7/2010 | Okamura | H04B 7/04 375/260 |
| 2010/0329375 A1 | 12/2010 | Nakayama | |
| 2012/0014279 A1 | 1/2012 | Miyoshi et al. | |
| 2013/0235744 A1 | 9/2013 | Chen et al. | |
| 2015/0372398 A1 | 12/2015 | Dudorov et al. | |
| 2017/0026095 A1 | 1/2017 | Ashrafi et al. | |

FOREIGN PATENT DOCUMENTS

| | | | | |
|---|---|---|---|---|
| WO | WO-2009017230 A1 | | 2/2009 | |
| WO | WO-2009096316 A1 | | 8/2009 | |
| WO | WO-2010098078 A1 | | 9/2010 | |
| WO | WO-2016148262 A1 | * | 9/2016 | H04B 7/06 |

OTHER PUBLICATIONS

Generation of Radio Orbital Angular Momentum (OAM) Waves with Circular Metallic Waveguide (Year: 2020).*
E. Sasaki et al., "Pragmatic OAM with Polarization Multiplexing Transmission for future 5G Ultra-High Capacity Radio", Proceedings of the 46th European Microwave Conference, pp. 154-pp. 157, Oct. 4-6, 2016.
Edfors, Ove et al., "Is Orbital Angular Momentum (OAM) Based Radio Communication an Unexploited Area?", IEEE Transactions on Antennas and Propagation, vol. 60, issue: 2, Feb. 2012, pp. 1126-1131.
Opare, Kwasi A. et al., "Performance of an Ideal Wireless Orbital Angular Momentum Communication System Using Multiple-input Multiple-output Techniques", 2014 International Conference on Telecommunications and Multimedia (TEMU), Jun. 30, 2014, pp. 144-149.
International Search Report (English and Japanese) issued in PCT/JP2018/035535, dated Dec. 18, 2018; ISA/JP.
Wu, Xiong et al., "Inter-Mode Crosstalk Compensation For Radio Orbital Angular Momentum Multiplexing Systems Under Misaligned Condition Using Multiple-Input Multiple-Output Techniques", 2016, 15th International Conference On Optical Communications And Networks (ICOCN). IEEE, pp. 1-3.
Chen, Rui et al., "Misalignment-Robust Receiving Scheme For UCA-Based OAM Communication Systems", 2017 IEEE 85th Vehicular Technology Conference (VTC Spring).
J. Wang et al., "Terabit free-space data transmission employing orbital angular momentum multiplexing", Nature Photonics, vol. 6, p. 488-p. 496.
Z. Li et al., "Dual-channel Wireless Communication System by Multiplexing Twisted Radio Wave", Proceedings of the 44th European Microwave Conference, p. 235-p. 238.
Yuan, Yuqing et al., "Capacity analysis of UCA-based OAM multiplexing communication system". 2015 International Conference on Wireless Communications & Signal Processing (WCSP), Oct. 17, 2015.
Opare, Kwasi A. et al., "Performance of an Ideal Wireless Orbital Angular Momentum Communication System Using Multiple-input Multiple-output Techniques", 2014 International Conference on Telecommunications and Multimedia (TEMU), Jun. 30, 2014.
Lee, Doohwan et al., "Orbital Angular Momentum (OAM) Multiplexing: An Enabler of a New Era of Wireless Communications", IEICE Transactions on Communications, Jul. 2017, www.jstage.jst.go.jp/articl/transcom/E100.B/7/E100.B_2016SCI---1/_pdf. (Year: 2017).

\* cited by examiner

OAM MULTIPLEXING COMMUNICATION SYSTEM AND INTER-MODE INTERFERENCE ELIMINATION METHOD

CROSS REFERENCE TO RELATED APPLICATION

This application is a U.S. National Stage application claiming the benefit of prior filed International Application Number PCT/JP2018/035535, filed on Sep. 25, 2018, in which the International Application claims priority from Japanese Patent Application Number 2017-183847, filed on Sep. 25, 2017, the entire contents of which are incorporated herein by reference.

TECHNICAL FIELD

The present invention relates to an OAM multiplexing communication system and an inter-mode interference elimination method of subjecting a radio signal to spatial multiplex transmission by using orbital angular momentum (OAM) of an electromagnetic wave.

BACKGROUND ART

A technique of subjecting a radio signal to spatial multiplex transmission using OAM is effective to improve a transmission capacity in wireless communication. An electric wave having an OAM mode has a feature that an equiphase surface thereof is distributed in a spiral form along a rational direction centering on a propagation axis of a beam, and a mode in which a cycle of a spiral formed by an equiphase surface is $2\pi \times k$ will be referred to as an OAM mode k. Different OAM modes have orthogonality in a rotational direction, and thus signals in a plurality of OAM modes can be subjected to spatial multiplex transmission. For example, since signals in an OAM mode 1 and an OAM mode 2 are orthogonal to each other on a space, even though the signals in the modes are simultaneously transmitted from transmitting antennae, the signals in the OAM mode 1 and the OAM mode 2 can be demultiplexed from each other on a reception side. As a method of generating an OAM mode, a method using a uniform circular array (UCA) in which a plurality of antenna elements are disposed circularly at an equal interval has been reported.

In an OAM multiplexing communication system, UCAs used as transmitting and receiving antennae are disposed to face each other, and weight multiplication on a transmission side and weight multiplication on a reception side related to OAM mode transmission can be uniformized regardless of a distance between the transmitting and receiving antennae (Non-Patent Document 1). Herein, a Butler matrix circuit performing a discrete Fourier transform (DFT) applied to transmitting and receiving weight multiplication is mounted, and a calculation amount for digital signal processing related to OAM mode transmission is reduced.

FIG. 9 illustrates a configuration example of an OAM multiplexing communication system of the related art. In FIG. 9, each of antennae of a transmitting station and a receiving station is a UCA including L antenna elements. For simplification of description, the number of antenna elements of the UCA of each of the transmitting station and the receiving station is the same as a spatial multiplex number (L multiplex).

When a transmission signal sequentially is input, a serial (S)/parallel (P) conversion/signal processing unit 11 of the transmitting station converts the transmission signal sequence into L parallel bit strings, performs modulation on each bit string, and outputs a transmission signal sequence $s_I$ (where I=1, 2, ..., and L). A transmitting OAM mode generation unit 14 receives the transmission signal sequence $s_I$, performs DFT calculation, and outputs a result thereof to each antenna element of a transmitting UCA 15. The transmitting UCA 15 transmits an output signal from the transmitting OAM mode generation unit 14.

A receiving UCA 21 of the receiving station receives a signal in a spatially multiplexed OAM mode with each antenna element, and outputs the signal to a receiving OAM mode demultiplex unit 22. The receiving OAM mode demultiplex unit 22 performs inverse DFT (IDFT) on a received signal in each antenna element, separates the spatially multiplexed OAM mode, and outputs a received signal sequence $r_I$ (where I=1, 2, ..., and L). A signal processing/P/S conversion unit 24 demodulates each received signal sequence, and thus outputs received signal sequences rearranged in an original order.

FIG. 9 schematically illustrates a positional relationship between the transmitting UCA 15 and the receiving UCA 21. Circularly disposed antenna elements (indicated by ● in FIG. 9) forming the transmitting UCA 15 and the receiving UCA 21 are disposed such that each antenna aperture surface is perpendicular to a straight line (optical axis) W connecting the centers P and Q of the antenna elements. In this case, a channel matrix H between the transmitting UCA 15 and the receiving UCA 21 is a circulant matrix regardless of a distance between the transmitting and receiving UCAs. According to property of the circulant matrix, a channel matrix is subjected to eigenvalue decomposition through DFT calculation and IDFT calculation, and thus the received signal $r_I$ in the OAM multiplexing communication system illustrated in FIG. 9 is as follows at all times.

$$r_I = \lambda_I s_I \tag{1}$$

Therefore, a signal can be received without interference between modes regardless of a transmission distance. Here, $\lambda_I$ is a singular value in the mode I.

Non-Patent Document 1: E. Sasaki, M. Hirabe, T. Maru, N. Zein, "Pragmatic OAM with Polarization Multiplexing Transmission for future 5G Ultra-High Capacity Radio", in Proceedings of EuMA2016, October 2016.

DISCLOSURE

Problems to be Solved

In the configuration disclosed in Non-Patent Document 1, a transmitting UCA and a receiving UCA are disposed at positions facing each other, and the configuration is restricted to an open environment in which there is no reflected wave. However, in an actual operation, it is necessary to take into consideration a case where the transmitting UCA and the receiving UCA are provided at fixed positions deviated from front facing disposition, or the influence of a reflected wave or the like due to a surrounding environment. When a channel matrix between the transmitting UCA and the receiving UCA is deviated from ideal front facing disposition due to the influence, interference between OAM modes remains in an output stage of a Butler matrix circuit of a reception side. Thus, the received signal n in the OAM mode I is represented in the following equation.

$$r_t = \lambda'_l s_l + \sum_{k \neq l} \lambda'_{l,k} s_k \tag{2}$$

Consequently, communication quality deteriorates due to interference from an OAM mode, indicated in the second term, which is different from the OAM mode I. In Equation (2), $\lambda'_I$ is a constant multiplied by an output in the OAM mode I, and $\lambda'_{I,k}$ is a constant indicating an interference amount from the OAM mode k to the OAM mode I.

A proposition of the present invention is to provide an OAM multiplexing communication system and an inter-mode interference elimination method capable of suppressing inter-mode interference occurring due to deviation of an optical axis, a tilt, or a reflected wave between a transmitting UCA and a receiving UCA with low computational complexity.

Means for Solving the Problems

According to a first embodiment, there is provided an OAM multiplexing communication system that subjects a plurality of transmission signal sequences to spatial multiplex transmission by using an orbital angular momentum (OAM) mode, the OAM multiplexing communication system including a transmitting station including a transmitting antenna using an M-UCA formed of a plurality of $M_{TX}$ uniform circular arrays (UCAs) that are concentrically disposed at an equal interval and have different diameters, each of the UCAs having a plurality of antenna elements disposed circularly at an equal interval; and a receiving station including a receiving antenna using an M-UCA formed of a plurality of $M_{RX}$ UCAs in the same manner as the transmitting station, in which the transmitting station includes a plurality of transmitting weight multiplication units each inputting the plurality of transmission signal sequences and multiplying each of the transmission signal sequences by a transmitting weight, to be converted into $M_{TX}$ signals corresponding to the UCAs forming the M-UCA so as to output the converted signals, and $M_{TX}$ transmitting OAM mode generation units inputting the signals corresponding to the UCAs output from each of the plurality of transmitting weight multiplication units and performing discrete Fourier transform on the input signals, so as to output to the corresponding UCAs; and the receiving station includes $M_{RX}$ receiving OAM mode demultiplex units inputting signals from each of the UCAs forming the M-UCA and performing inverse Fourier transform on the input signals, so as to output by each of received signal sequences, and a plurality of receiving weight multiplication units multiplying for each of the received signal sequences output from the receiving OAM mode demultiplex units by a receiving weight, so as to demultiplex the received signal sequences subjected to spatial multiplex transmission and to output the received signal sequence in which interference between spatially multiplexed OAM modes is suppressed.

In the OAM multiplexing communication system according to the first embodiment, the transmitting weight multiplication units are configured to receive the plurality of transmission signal sequences and to multiply the transmission signal sequences by the transmitting weight; and the receiving weight multiplication units are configured to demultiplex the plurality of received signal sequences subjected to the spatial multiplex transmission.

The OAM multiplexing communication system according to the first embodiment further includes a weight calculation unit performing channel estimation based on output values from the receiving OAM mode demultiplex units for a known signal sequence transmitted from the transmitting station to the receiving station, and determining the transmitting weight and the receiving weight, in which the receiving weight is configured to set in the receiving weight multiplication units, and the transmitting weight is configured to feed back to the transmitting station from the receiving station to be set in the transmitting weight multiplication units, so that an interference component between OAM modes subjected to the spatial multiplex transmission is suppressed.

According to a second embodiment, there is provided an inter-mode interference elimination method for an OAM multiplexing communication system that subjects a plurality of transmission signal sequences to spatial multiplex transmission by using an orbital angular momentum (OAM) mode; that includes a transmitting station including a transmitting antenna using an M-UCA formed of a plurality of $M_{TX}$ uniform circular arrays (UCAs) that are concentrically disposed at an equal interval and have different diameters, each of the UCAs having a plurality of antenna elements disposed circularly at an equal interval; and that includes a receiving station including a receiving antenna using an M-UCA formed of a plurality of $M_{RX}$ UCAs in the same manner as the transmitting station, the inter-mode interference elimination method including causing a plurality of transmitting weight multiplication units of the transmitting station each to input the plurality of transmission signal sequences and to multiply each of the transmission signal sequences by a transmitting weight, to be converted into $M_{TX}$ signals corresponding to the UCAs forming the M-UCA so as to output the converted signals; causing $M_{TX}$ transmitting OAM mode generation units of the transmitting station to input the signals corresponding to the UCAs output from each of the plurality of transmitting weight multiplication units and to perform discrete Fourier transform on the input signals, so as to output to the corresponding UCAs; causing $M_{RX}$ receiving OAM mode demultiplex units of the receiving station to input signals from each of the UCAs forming the M-UCA and to perform inverse Fourier transform on the input signals, so as to output by each of received signal sequences; and causing a plurality of receiving weight multiplication units of the receiving station to multiply for each of the received signal sequences output from the receiving OAM mode demultiplex units by a receiving weight so as to demultiplex the received signal sequence subjected to spatial multiplex transmission and to output the received signal sequence in which interference between spatially multiplexed OAM modes is suppressed.

In the inter-mode interference elimination method for an OAM multiplexing communication system according to the second embodiment, in which channel estimation is performed based on output values from the receiving OAM mode demultiplex units for a known signal sequence transmitted from the transmitting station to the receiving station, and the transmitting weight and the receiving weight are determined; and the receiving weight is set in the receiving weight multiplication units, and the transmitting weight is fed back to the transmitting station from the receiving station to be set in the transmitting weight multiplication units, so that an interference component between OAM modes subjected to spatial multiplex transmission is suppressed.

In the inter-mode interference elimination method for an OAM multiplexing communication system according to the second embodiment, in which the transmitting weight and the receiving weight for suppressing interference between spatially multiplexed signals may be determined based on a result of singular value decomposition on a matrix representing interference components from other discrete frequency components remaining in a specific discrete frequency component, and a result of singular value decomposition on a matrix representing a self-discrete frequency component, in outputs from the receiving OAM mode demultiplex units.

A weight including a vector orthogonal to one or more vectors among vectors included in left singular vectors may be set as the receiving weight, the left singular vectors are a result of singular value decomposition on a matrix representing interference components from other discrete frequency components in outputs from the receiving OAM mode demultiplex units.

The transmitting weight and the receiving weight may be determined based on singular value decomposition on a multiplication result between a vector orthogonal to a vector included in left singular vectors and a matrix representing a self-discrete frequency component, the left singular vectors are a result of singular value decomposition on a matrix representing interference components from other discrete frequency components in outputs from the receiving OAM mode demultiplex units.

A multiplex number of spatially multiplexed signals may be determined based on a standard in which a total rate corresponding to a received signal quality is the maximum, or may be determined in advance.

Effect

According to the present invention, a transmitting weight and a receiving weight are appropriately set, and thus it is possible to suppress interference between OAM modes caused by a case where a transmitting antenna and a receiving antenna are provided at fixed positions deviated from front facing disposition, or a reflected wave or the like due to a surrounding environment.

DETAILED DESCRIPTION OF THE EMBODIMENTS

Figure 1:
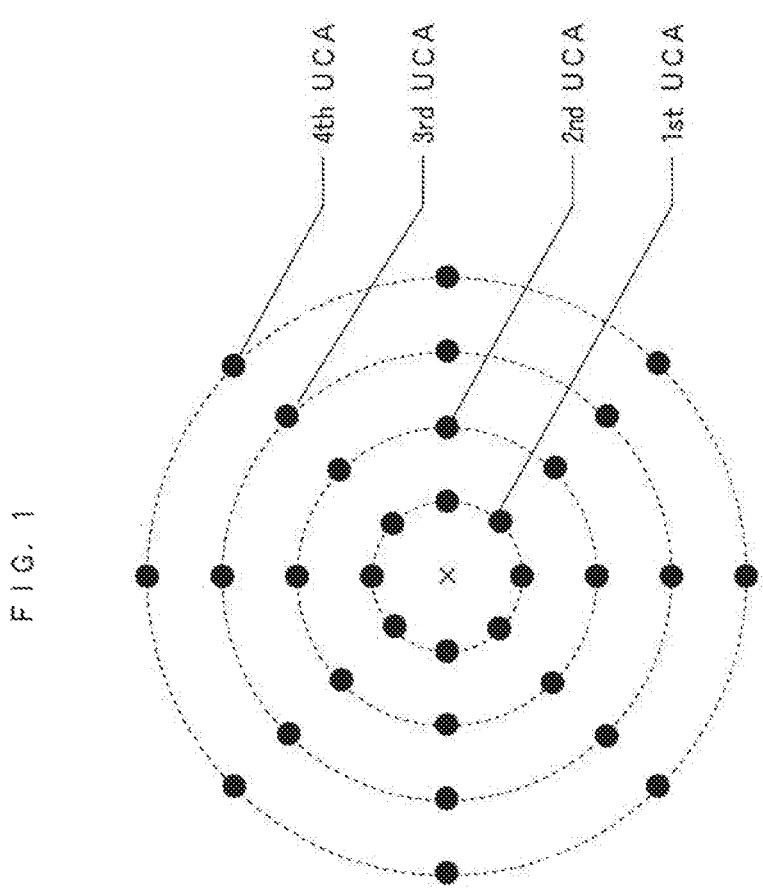
FIG. 1 is a diagram illustrating a configuration example of an M-UCA of an OAM multiplexing communication system of the present invention.

FIG. 1 is a diagram illustrating a configuration example of an M-UCA of an OAM multiplexing communication system of the present invention. In FIG. 1, a multi (M)-UCA has a configuration in which a plurality of UCAs are disposed concentrically or at an equal interval. Herein, a configuration in which four UCAs are disposed is illustrated, and the UCAs are referred to as a first UCA, a second UCA, a third UCA, and a fourth UCA in this order from the inner UCAs. A transmitting UCA will be referred to as an n-th transmitting UCA, and a receiving UCA will be referred to as an n-th receiving UCA. As an example, each UCA includes eight antenna elements (indicated by in FIG. 1), but the number of antenna elements of each UCA is not necessarily required to be the same.

The definition of each symbol used in the following description is as follows.

The number of antenna elements of an m-th transmitting UCA: $N_{TX}(m)$

The number of UCAs forming an M-UCA of a transmission side: $M_{TX}$.

The number of antenna elements of an n-th transmitting UCA: $N_{RX}(n)$

The number of UCAs forming a M-UCA of reception side: $M_{RX}$

A channel matrix between the m-th transmitting UCA and the n-th receiving UCA: $H_{m,n} \in \mathbb{C}^{N_{RX}(n) \times N_{TX}(m)}$ T and H: superscripts and complex conjugate transpositions $\mathbb{C}$: a set representing all complex numbers Example 1

Figure 2:
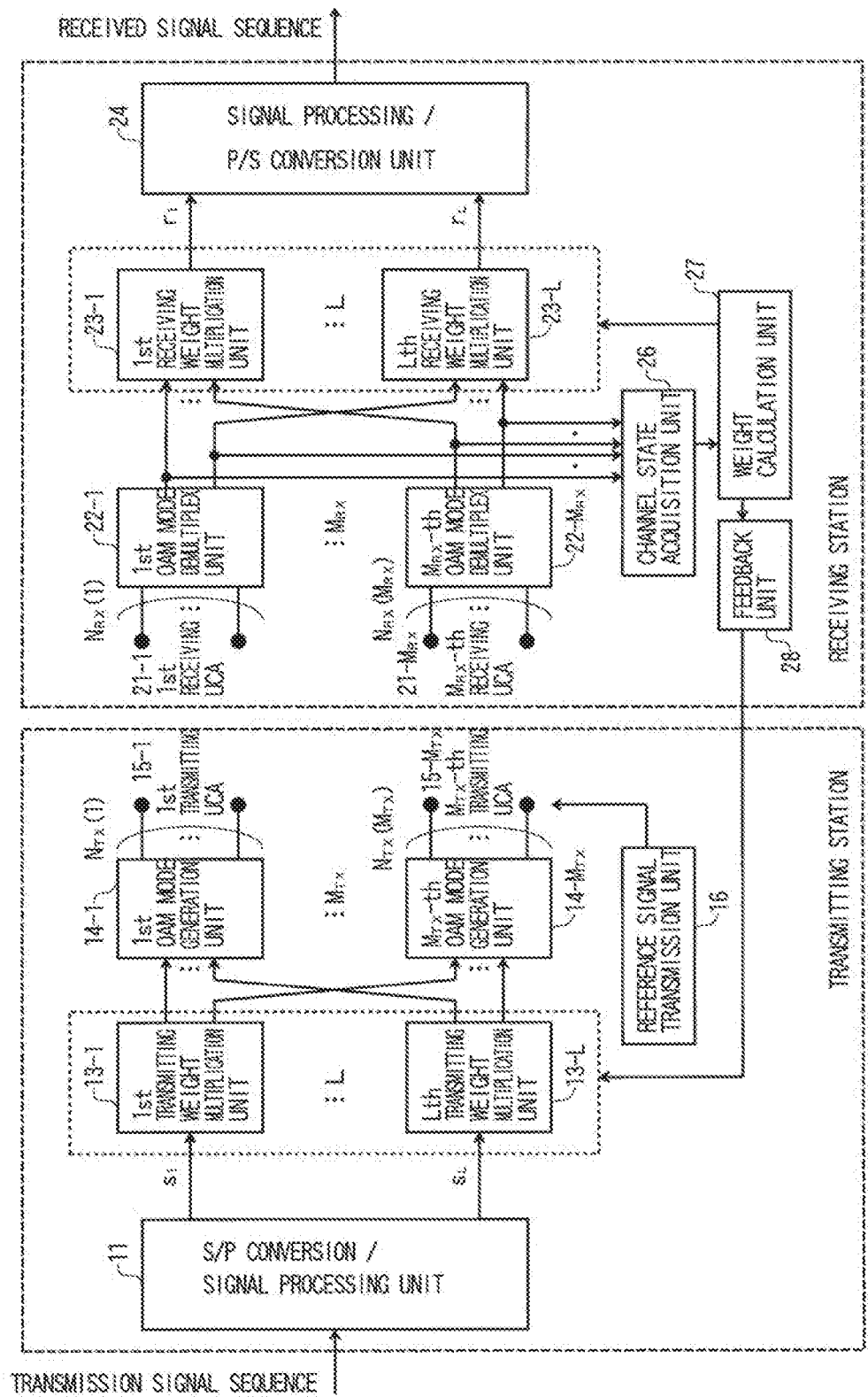
FIG. 2 is a diagram illustrating a configuration of Example 1 of the OAM multiplexing communication system of the present invention.

FIG. 2 is a diagram illustrating a configuration of Example 1 of the OAM multiplexing communication system of the present invention. In FIG. 2, a transmitting station includes an S/P conversion/signal processing unit 11, L transmitting weight multiplication units such as a first transmitting weight multiplication unit 13-1 to an L-th transmitting weight multiplication unit 13-L, $M_{TX}$ transmitting OAM mode generation units such as a first transmitting OAM mode generation unit 14-1 to an $M_{TX}$-th transmitting OAM mode generation unit 14-$M_{TX}$ respectively corresponding to $M_{TX}$ transmitting UCAs 15-1 to 15-$M_{TX}$, and a reference signal transmission unit 16.

A receiving station includes $M_{RX}$ receiving OAM mode demultiplex units such as a first receiving OAM mode demultiplex unit 22-1 to an $M_{RX}$-th receiving OAM mode demultiplex unit 22-$M_{RX}$ respectively corresponding to $M_{RX}$ receiving UCAs 21-1 to 21-$M_{RX}$, L receiving weight multiplication units such as a first receiving weight multiplication unit 23-1 to an L-th receiving weight multiplication unit 23-L, a signal processing/P/S conversion unit 24, a channel state acquisition unit 26, a weight calculation unit 27, and a feedback unit 28.

The OAM multiplexing communication system of Example 1 has an antenna configuration using an M-UCA unlike the configuration of the related art. There are differences in that a weight calculated by acquiring channel information is fed back to the transmitting station, and weights calculated based on the channel information are multiplied in the transmitting station and the receiving station.

First, input and output relationships of the transmitting station and the receiving station in Example 1 are expressed by equations. The transmitting station performs S/P conversion on an input transmission signal sequence that is thus converted into L parallel bit strings, and modulates each bit string so as to generate a transmission signal $s_l$ (where l=1, 2, . . . , and L)

The I-th transmitting weight multiplication unit 13-I multiplies the transmission signal $s_I$ by a transmitting weight $V_I$ so as to output $s'_I$.

$$V_l \in \mathbb{C}^{M_{TX} \times 1}$$

$$s'_l \triangleq V_l s_l = (s'_l[1], \ldots, s'_l[M_{TX}])^T$$

The m-th OAM mode generation unit 14-m receives a signal vector $S'[m] = (s'_1[m], \ldots, s'_L[m])^T$ in which m-th signals $s'_l[m]$ (where $l=1, 2, \ldots,$ and L) respectively output from the first transmitting weight multiplication unit 13-1 to the L-th transmitting weight multiplication unit 13-L are arranged, and multiplies $S'[m]$ by a DFT matrix $D_m^{TX}$, and outputs a result thereof. Here, $D_m^{TX}$ is a DFT matrix of $N_{TX}(m) \times L$ of which a component corresponding to p row and q column is given by [Expression 5], j in the expression indicates an imaginary number unit, and $I(q)$ indicates a discrete frequency index of DFT on the q-th column.

$$\exp\left(-\frac{j2\pi(p-1) \cdot l(q)}{N_{TX}(m)}\right)$$

A process related to the DFT calculation may be performed by an analog circuit using the same Butler matrix as in Non-Patent Document 1, and may be performed through digital signal processing. Output signals from the first transmitting OAM mode generation unit 14-1 to the $M_{TX}$-th transmitting OAM mode generation unit 14-$M_{TX}$ are transmitted from the transmitting UCAs 15-1 to 15-$M_{TX}$ respectively coupled to DFT calculation units to the receiving UCAs. In this case, a signal received by the k-th receiving UCA 21-k is as follows.

$$\sum_{m=1}^{M_{TX}} H_{m,k} D_m^{TX} S'[m] \tag{3}$$

In Expression (3), for simplification of description, a noise term is omitted.

Next, the k-th receiving OAM mode demultiplex unit 22-k of the receiving station multiplies the signal received by the k-th receiving UCA 21-k by an IDFT matrix $D_k^{RX}$, and outputs a result thereof. Here, a component corresponding to p row and q column of the IDFT matrix $D_k^{RX}$ is expressed as follows.

$$D_k^{RX} \in \mathbb{C}^{L \times N_{RX}(k)}$$

Component corresponding to p row and q column:

$$\exp\left(\frac{j2\pi l(p) \cdot (q-1)}{N_{RX}(k)}\right)$$

Here, $I(p)$ indicates a discrete frequency index of IDFT on a p-th column.

An output from the k-th reception IDFT calculation unit 22-k is as follows.

$$(r_k[1], \ldots, r_k[L])^T = \sum_{m=1}^{M_{TX}} D_k^{RX} H_{m,k} D_m^{TX} S'[m]$$

The I-th receiving weight multiplication unit 23-I receives the following vector r[I] in which I-th outputs $r_k[I]$ (where $k=1, 2, \ldots,$ and $M_{RX}$) from the first receiving OAM mode demultiplex unit 22-1 to the $M_{RX}$-th receiving OAM mode demultiplex unit 22-$M_{RX}$ are arranged, and multiplies the vector by a receiving weight $U_I$, and outputs a result thereof.

Input $r[l] \triangleq (r_1[l], \ldots, r_{M_{RX}}[l])^T \in \mathbb{C}^{M_{RX} \times 1}$ to be multiplied by a receiving weight $U_l$ and output.

$U_l \in \mathbb{C}^{1 \times M_{RX}}$ $r_l = U_l r[l]$

The signal processing/P/S conversion unit 24 estimates a transmitted information bit string based on the signal n subjected to receiving weight multiplication, performs P/S conversion on the estimated information bit string, and arranges the information bit strings in an original order.

The reference signal transmission unit 16 of the transmitting station transmits a known signal sequence for estimating a channel response to the receiving station.

The channel state acquisition unit 26 of the receiving station is coupled to the first receiving OAM mode demultiplex unit 22-1 to the $M_{RX}$-th receiving OAM mode demultiplex unit 22-$M_{RX}$, and estimates a channel response based on the known signal sequence. The estimated information is output to the weight calculation unit 27.

The weight calculation unit 27 determines a transmitting weight and a receiving weight based on an estimated value in the channel state acquisition unit 26, sets the weights in the first receiving weight multiplication unit 23-1 to the L-th receiving weight multiplication unit 23-L of the receiving station, and sets the weights in the first transmitting weight multiplication unit 13-1 to the L-th transmitting weight multiplication unit 13-L of the transmitting station via the feedback unit 28.

Next, a description will be made of a method of calculating a transmitting weight and a receiving weight in the weight calculation unit 27. For clarification of description, an interference component remaining in the signal $r_I$ subjected to receiving weight multiplication is expressed by an equation. First, when the M-UCAs of the transmitting station and the receiving station face each other, and thus interference does not occur, the channel matrix $H_{m,k}$ is made diagonal as a result of being multiplied by the IDFT matrix $D_k^{RX}$ from the left and multiplied by the DFT matrix $D_m^{TX}$ from the right. Therefore, the signal $r_I$ output from the l-th receiving weight multiplication unit 23-I is as follows.

$$r_I = U_l \Lambda_l V_l s_l \tag{4}$$

$\Lambda_l$ in Equation (4) is a matrix of $M_{RX} \times M_{TX}$ representing each channel response. It can be seen from Equation (4) that interference from other signals (different OAM modes) having different indexes I does not occur in front facing. Therefore, in the same manner as in the configuration of the related art, the signal processing/P/S conversion unit 24 can estimate a bit string $s_l$ for each signal $r_l$ without interference from other modes. On the other hand, in other cases, the signal $r_I$ is a signal including interference from other modes.

$$r_l = U_l \Lambda_l V_l s_l + U_l \left( \sum_{k \neq l} \Lambda_{l,k} V_k s_k \right) \tag{5}$$

The second term in Equation (5) is an interference component, and signal quality deteriorates due to interference from transmission signals having different indexes I. $\Lambda_{I,k}$ is a matrix of $M_{RX} \times M_{TX}$ representing interference from the OAM mode k to the OAM mode I.

Hereinafter, a description will be made of a method of determining the transmitting weight $V_I$ and the receiving weight $U_I$ for improving communication quality by suppressing an interference component (a signal component of the second term in Equation (5)).

In Example 1, a matrix of an interference component is subjected to singular value decomposition (SVD), and a vector orthogonal to a left singular vector with a large interference amount is used as a receiving weight, and thus the interference component is suppressed.

First, if the matrix $\Lambda_I^{(INT)}$ of the interference component is subjected to singular value decomposition in order to find out a singular vector with a large interference amount, Equation (6) is obtained.

$$A_I^{(INT)} \triangleq (A_{I,1}, \ldots, A_{I,I-1}, A_{I,I+1}, \ldots, A_{I,L}) \in \mathbb{C}^{M_{RX} \times M_{TX}(L-1)} \quad (6)$$

$$A_I^{(INT)} = (u_{I,1}, \ldots, u_{I,M_{RX}}) \begin{pmatrix} \sigma_1 & & 0 \\ & \ddots & & O_{M_{RX} \times M_{TX}(L-1)-M_{RX}} \\ 0 & & \sigma_{M_{RX}} \end{pmatrix} (v_{I,1}, \ldots, v_{I,M_{TX}(L-1)})^H$$

Here, $u_{I,m} \in \mathbb{C}^{M_{RX} \times 1}$ is a left singular vector of $\Lambda_I^{(INT)}$.

$v_{I,m} \in \mathbb{C}^{M_{TX}(L-1) \times 1}$ is a right singular vector of $\Lambda_I^{(INT)}$.

Each of the matrixes $(u_{I,1}, \ldots, u_{I,M_{RX}})$ and $(v_{I,1}, \ldots, v_{I,M_{TX}(L-1)})$ is a unitary matrix.

$O_{n \times m}$ indicates a zero matrix of n rows and m columns. The singular value $\sigma_m$ is assumed to be $|\sigma_1| > |\sigma_2| > \ldots > |\sigma_{M_{RX}}|$.

The received signal in Equation (5) may be rewritten as follows by using the singular value decomposition result in Equation (6).

$$r_i = U_I A_I V_I s_I + U_I \left( \sum_{m=1}^{M_{RX}} \sigma_m u_{I,m} v_{I,m}^H \right) \begin{pmatrix} V_1 s_1 \\ \vdots \\ V_{l-1} s_{l-1} \\ V_{l+1} s_{l+1} \\ \vdots \\ V_L s_L \end{pmatrix} \quad (7)$$

It can be seen from Equation (7) that, if the received signal n is multiplied by the complex conjugate transposition $u_{I,m}^H$ of the left singular vector $u_{I,m}$, components other than $\sigma_m u_{I,m} V_{I,m}^H$ are removed from the interference component (the second term in Equation (7)) included in an output from the I-th receiving weight multiplication unit 23-I due to the orthogonality between left singular vectors. In order to effectively suppress interference in a received signal, the left singular vector $u_{I,M_{RX}}^H$ in which a singular value is the minimum may be used as the receiving weight $U_I$ such that a great interference term is removed. In this case, the received signal n is given as follows, and it can be seen that the interference component is suppressed after receiving weight multiplication. A receiving weight may be a vector other than the left singular vector $u_{I,M_{RX}}^H$ with the minimum singular value, for example, may be $U_{I,M_{RX}-1}^H$.

$$r_l = u_{I,M_{RX}}^H A_l V_l s_l + u_{I,M_{RX}}^H \left( \sum_{m=1}^{M_{RX}} \sigma_m u_{I,m} v_{I,m}^H \right) \begin{pmatrix} V_1 s_1 \\ \vdots \\ V_{l-1} s_{l-1} \\ V_{l+1} s_{l+1} \\ \vdots \\ V_L s_L \end{pmatrix}$$

$$= u_{I,M_{RX}}^H A_l V_l s_l + \sigma_{M_{RX}} v_{I,M_{RX}}^H \begin{pmatrix} V_1 s_1 \\ \vdots \\ V_{l-1} s_{l-1} \\ V_{l+1} s_{l+1} \\ \vdots \\ V_L s_L \end{pmatrix}$$

$$\because u_{I,m}^H u_{I,n} = 0,$$

if $n \neq m$ and $u_{I,n}^H u_{I,n} = 1$

On the other hand, the matrix $u_{I,M_{RX}}^H \Lambda_I$ forms an eigenspace not including a main interference component in a received signal. In the eigenspace, when a signal is transmitted by using an eigenvector having nonzero eigenvalues as a transmitting weight, it is possible to realize transmission of a signal not including a main interference component. Specifically, among right singular vectors obtained by subjecting the matrix $u_{I,M_{RX}}^H \Lambda_I$ to singular value decomposition, a right singular vector having nonzero singular values is determined as the transmitting weight $V_I$.

$$u_{I,M_{RX}}^H \kappa_I = \theta_{I,1} (\mu_{I,1}, O_{1 \times (M_{TX}-1)}) (\Phi_{I,1}, \ldots, \Phi_{I,M_{TX}})^H \quad (8)$$

Here, $\theta_{I,1} \in \mathbb{C}^{I \times 1}$ is a left singular vector of $u_{I,M_{RX}}^H \kappa_I$, and $\Phi_{I,m} \in \mathbb{C}^{M_{TX} \times 1}$ is a right singular vector of $u_{I,M_{RX}}^H \kappa_I$. In addition, $\mu_{i,1}$ is an eigenvalue.

When the tight singular vector $\Phi_{I,1}$ in Equation (8) determined as the transmission vector $V_I$, the following equation is given.

$$r_l = u_{I,M_{RX}}^H A_l \Phi_{I,1} s_l + \sigma_{M_{RX}} v_{I,M_{RX}}^H \begin{pmatrix} V_1 s_1 \\ \vdots \\ V_{l-1} s_{l-1} \\ V_{l+1} s_{l+1} \\ \vdots \\ V_L s_L \end{pmatrix} =$$

$$\theta_{I,1} \mu_{I,1} s_l + \sigma_{M_{RX}} v_{I,M_{RX}}^H \begin{pmatrix} V_1 s_1 \\ \vdots \\ V_{l-1} s_{l-1} \\ V_{l+1} s_{l+1} \\ \vdots \\ V_L s_L \end{pmatrix} \cong \theta_{I,1} \mu_{I,1} s_l$$

Thus, interference occurring due to a tilt or a reflected wave is reduced, and thus it is possible to increase bit estimation accuracy in a demodulation unit. If a receiving weight is not $U^H_{I,M_{RX}}$, a transmitting weight is determined based on a singular value decomposition result of the multiplication result $U_I \Lambda_{I,m}$ between the receiving weight $U_I$ and the matrix $\Lambda_{I,m}$.

Figure 3:
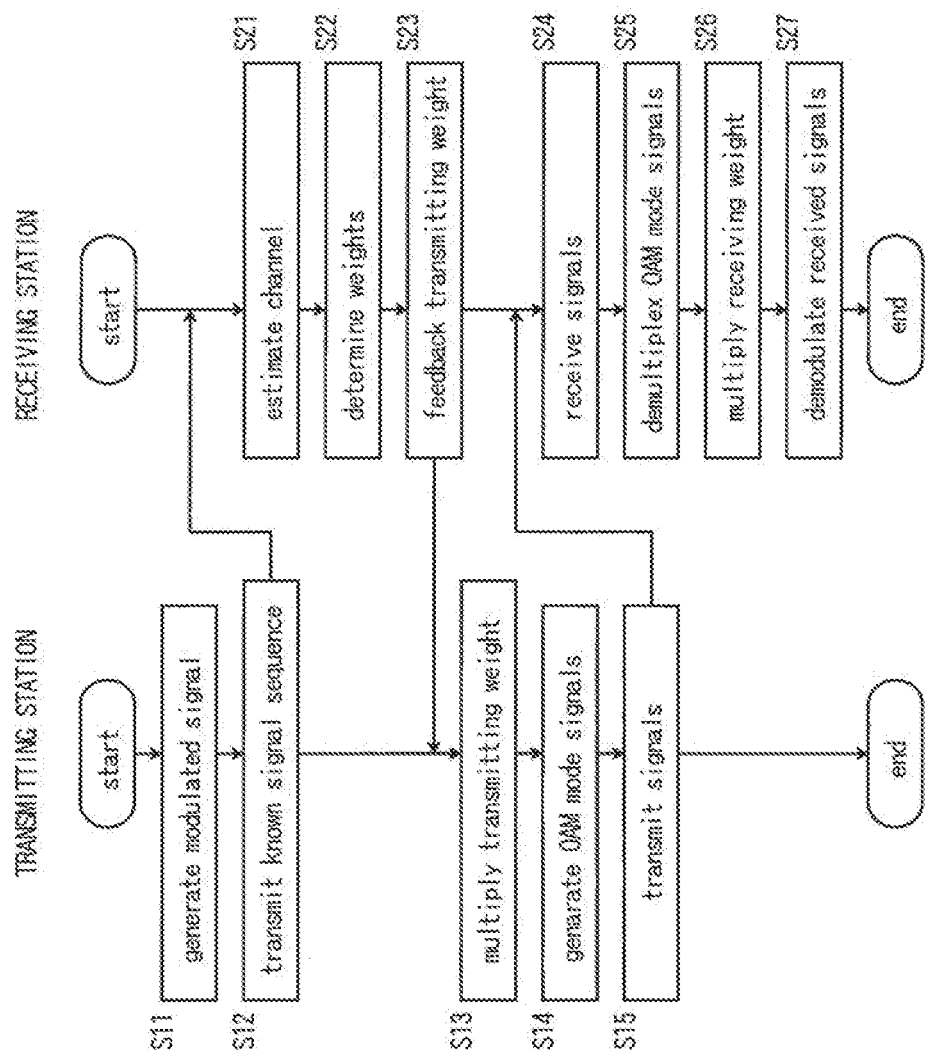
FIG. 3 is a flowchart illustrating process procedures in Example 1 of the OAM multiplexing communication system of the present invention.

FIG. 3 illustrates process procedures in Example 1 of the OAM multiplexing communication system of the present invention. In FIG. 3, if a transmission signal sequence is input to the transmitting station, the S/P conversion/signal processing unit 11 generates a modulated signal (S11). Next, the reference signal transmission unit 16 of the transmitting station transmits a known signal sequence (S12). When the receiving station receives the known signal sequence, the channel state acquisition unit 26 estimates responses $\Lambda_I$ and $\Lambda_{I,k}$ for each channel based on the known signal sequence (S21). The weight calculation unit 27 performs singular value decomposition represented in Equations (5) and (8) based on the estimated responses $\Lambda_I$ and $\Lambda_{I,k}$ for the channel, determines the transmitting weight $V_I$ and the receiving weight $U_I$ (S22), and sets the receiving weight $U_I$ in each receiving weight multiplication unit 23 of the receiving station. The feedback unit 28 sets the transmitting weight $V_I$ determined by the weight calculation unit 27 in each transmitting weight multiplication unit 13 of the transmitting station (S23).

Next, each transmitting weight multiplication unit 13 of the transmitting station multiplies the modulated signal generated in step S11 by the transmitting weight $V_I$ (S13). The transmitting OAM mode generation unit 14 performs an OAM mode generation process on the modulated signal multiplied by the transmitting weight $V_I$ according to DFT calculation (S14), and signals in respective OAM modes are respectively transmitted from the transmitting UCAs 15 of the transmitting station (S15).

The respective receiving UCAs 21 of the receiving station receive the signals transmitted from the transmitting station (S24), and the receiving OAM mode demultiplex units 22 perform an OAM mode demultiplex process on the signals according to IDFT calculation (S25). Next, each receiving weight multiplication unit 23 multiplies the received signals in the respective OAM modes by the receiving weight $U_I$ (S26). The signal processing/P/S conversion unit 24 demodulates the received signals in which inter-mode interference is suppressed through the above processes, to be converted into bit strings, and arranges the bit strings into an original information bit string through P/S conversion, and outputs the information bit string (S27).

Modification of Example 1

Figure 4:
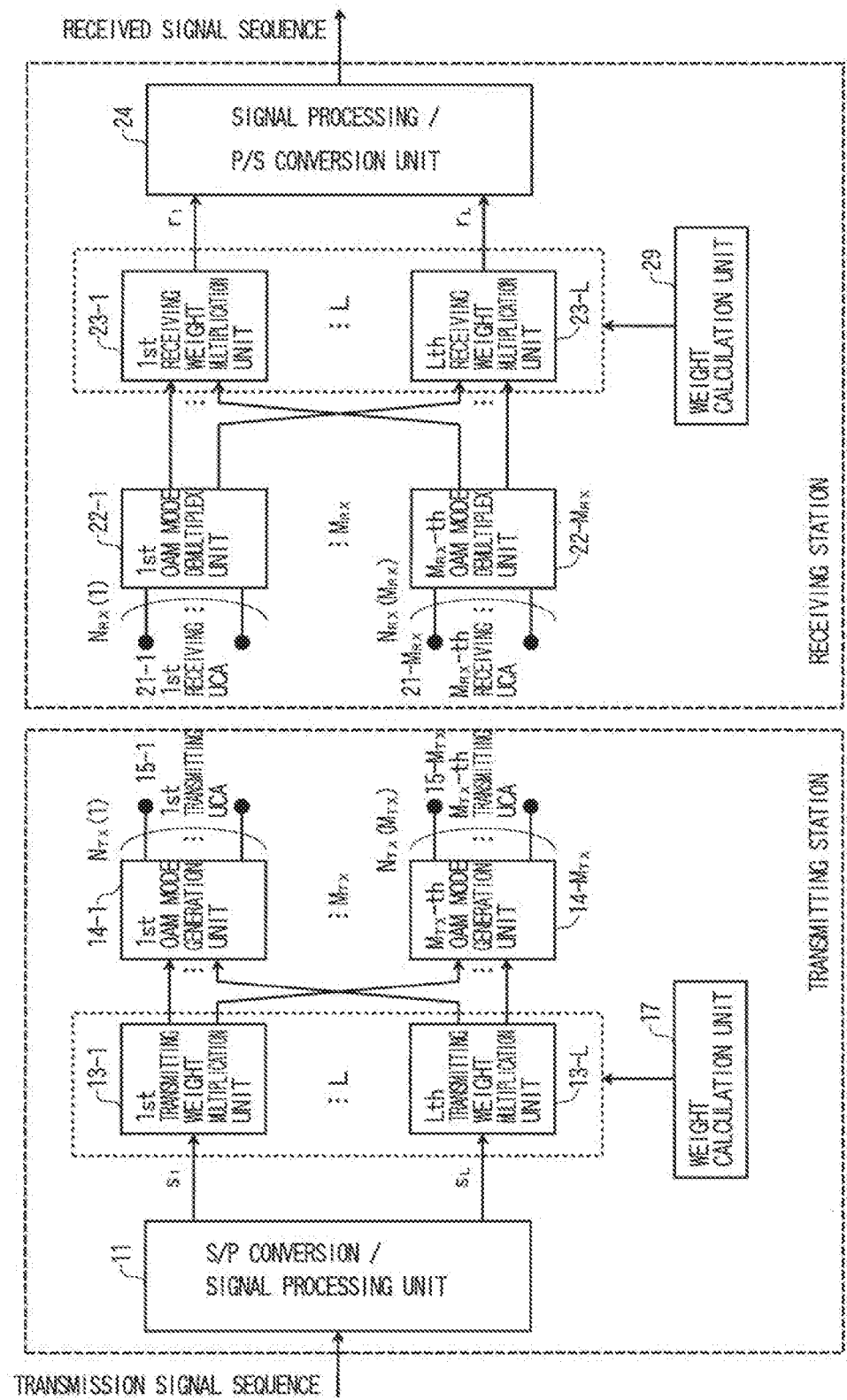
FIG. 4 is a diagram illustrating a modified configuration of Example 1 of the OAM multiplexing communication system of the present invention.

FIG. 4 illustrates a modified configuration of Example 1 of the OAM multiplexing communication system of the present invention. In FIG. 4, a transmitting station includes an S/P conversion/signal processing unit 11, L transmitting weight multiplication units such as a first transmitting weight multiplication unit 13-1 to an L-th transmitting weight multiplication unit 13-L, $M_{TX}$ transmitting OAM mode generation units such as a first transmitting OAM mode generation unit 14-1 to an $M_{TX}$-th transmitting OAM mode generation unit 14-$M_{TX}$ respectively corresponding to $M_{TX}$ transmitting UCAs 15-1 to 15-$M_{TX}$, and a weight calculation unit 17.

A receiving station includes $M_{RX}$ receiving OAM mode demultiplex units such as a first receiving OAM mode demultiplex unit 22-1 to an $M_{RX}$-th receiving OAM mode demultiplex unit 22-$M_{RX}$ respectively corresponding to $M_{RX}$ receiving UCAs 21-1 to 21-$M_{RX}$, L receiving weight multiplication units such as a first receiving weight multiplication unit 23-1 to an L-th receiving weight multiplication unit 23-L, a signal processing/P/S conversion unit 24, and a weight calculation unit 29.

A difference from Example 1 illustrated in FIG. 2 is that the receiving station does not perform channel estimation, and the transmitting station and the receiving station separately determine a transmitting weight and a receiving weight. In other words, in the configuration illustrated in FIG. 4, a channel response is estimated in advance in the transmitting station and the receiving station, an estimated value is held in the weight calculation unit 17 of the transmitting station and the weight calculation unit 29 of the receiving station, the weight calculation units 17 and 29 determine a transmitting weight and a receiving weight based on the channel response, and set the weights in the transmitting weight multiplication unit 13 and the receiving weight multiplication unit 23.

Figure 5:
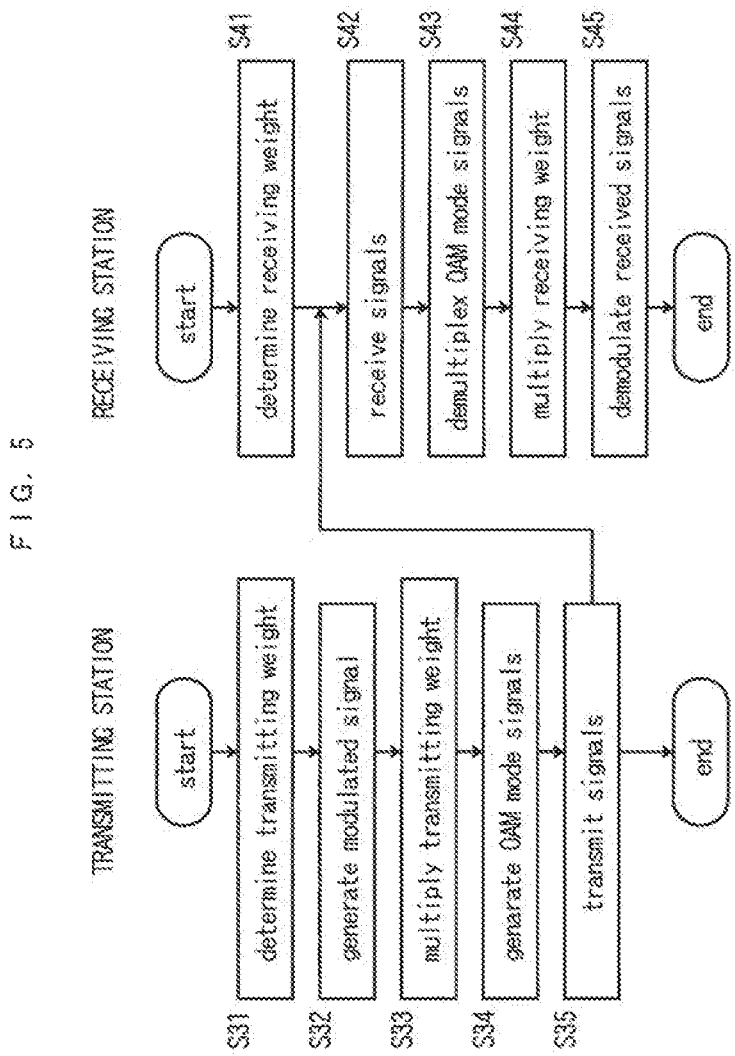
FIG. 5 is a flowchart illustrating process procedures in the modified configuration of Example 1 of the OAM multiplexing communication system of the present invention.

FIG. 5 illustrates process procedures in the modified configuration of Example 1 of the OAM multiplexing communication system of the present invention. In FIG. 5, if a transmission signal sequence is input to the transmitting station, the weight calculation unit 17 determines the transmitting weight $V_I$ based on a channel response value held in advance, and sets the transmitting weight in each transmitting weight multiplication unit 13 (S31). The S/P conversion/signal processing unit 11 generates a modulated signal (S32). Next, each transmitting weight multiplication unit 13 multiplies the generated modulated signal by the transmitting weight $V_I$ (S33). The transmitting OAM mode generation unit 14 performs an OAM mode generation process on the modulated signal multiplied by the transmitting weight $V_I$ according to DFT calculation (S34), and signals in respective OAM modes are respectively transmitted from the transmitting UCAs 15 (S35).

On the other hand, in the receiving station, the weight calculation unit 29 determines the receiving weight $U_I$ based on a channel response value held in advance, and sets the receiving weight in each receiving weight multiplication unit 23 (S41). The respective receiving UCAs 21 receive the signals transmitted from the transmitting station (S42), and the receiving OAM mode demultiplex units 22 perform an OAM mode demultiplex process on the signals according to IDFT calculation (S43). Next, each receiving weight multiplication unit 23 multiplies the received signals in the respective OAM modes by the receiving weight $U_I$ (S44). The signal processing/P/S conversion unit 24 demodulates the received signals in which inter-mode interference is suppressed through the above processes, to be converted into bit strings, and arranges the bit strings into an original information bit string through P/S conversion, and outputs the information bit string (S45).

Example 2

Figure 6:
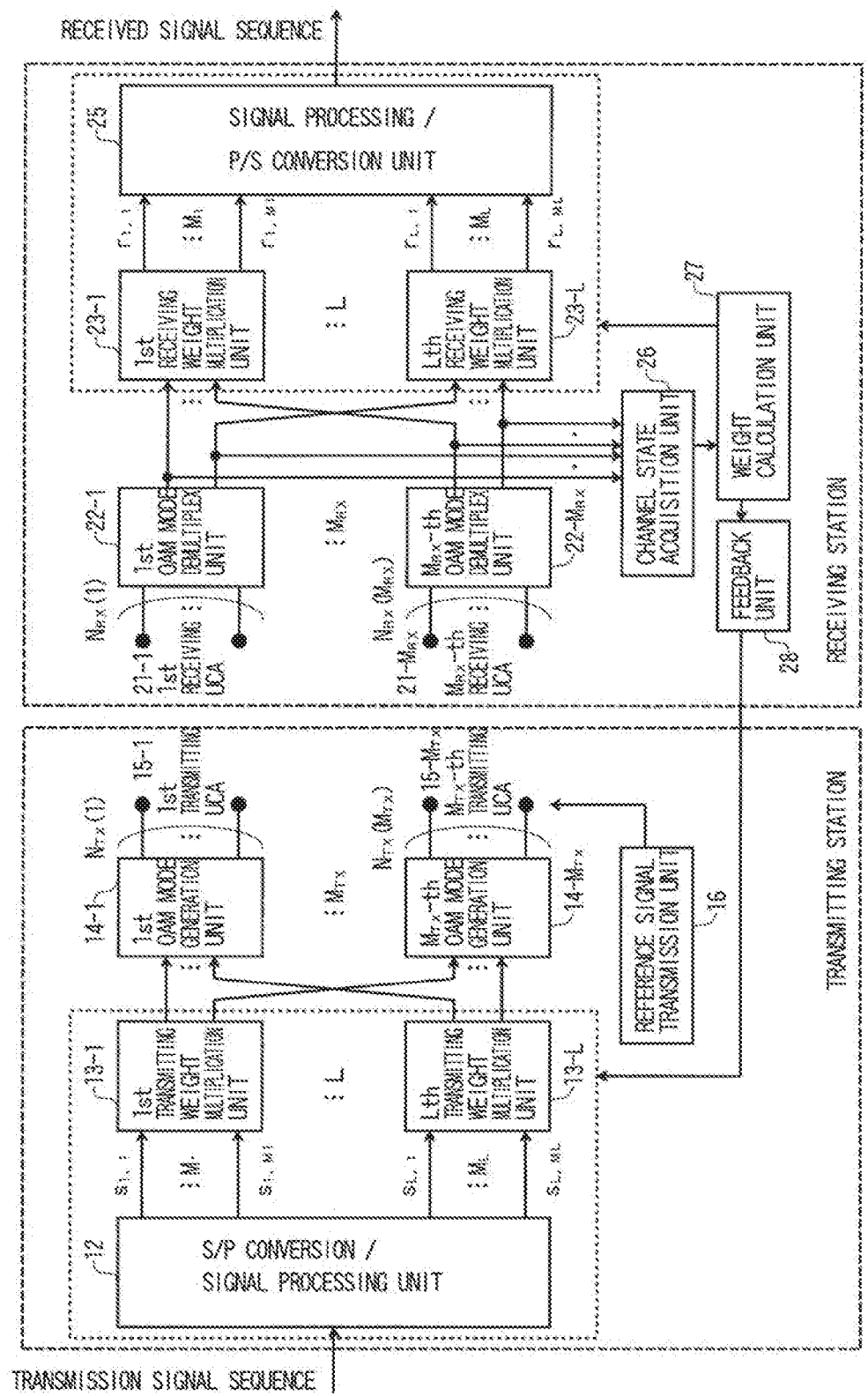
FIG. 6 is a diagram illustrating a configuration of Example 2 of the OAM multiplexing communication system of the present invention.

FIG. 6 is a diagram illustrating a configuration of Example 2 of the OAM multiplexing communication system of the present invention. In FIG. 6, a transmitting station includes an S/P conversion/signal processing unit 12, L transmitting weight multiplication units such as a first transmitting weight multiplication unit 13-1 to an L-th transmitting weight multiplication unit 13-L respectively receiving $M_1$ to $M_L$ signals, $M_{TX}$ transmitting OAM mode generation units such as a first transmitting OAM mode generation unit 14-1 to an $M_{TX}$-th transmitting OAM mode generation unit 14-$M_{TX}$ respectively corresponding to $M_{TX}$ transmitting UCAs 15-1 to 15-$M_{TX}$, and a reference signal transmission unit 16.

A receiving station includes $M_{RX}$ receiving OAM mode demultiplex units such as a first receiving OAM mode demultiplex unit 22-1 to an $M_{RX}$-th receiving OAM mode demultiplex unit 22-$M_{RX}$ respectively corresponding to $M_{RX}$ receiving UCAs 21-1 to 21-$M_{RX}$, L receiving weight multiplication units such as a first receiving weight multiplication unit 23-1 to an L-th receiving weight multiplication unit 23-L, a signal processing/P/S conversion unit 25 receiving $M_1$ to $M_L$ received signals, a channel state acquisition unit 26, a weight calculation unit 27, and a feedback unit 28.

The OAM multiplexing communication system of Example 2 is different from the OAM multiplexing communication system of Example 1 in that a modulated signal that is input to the single transmitting weight multiplication unit 13 has a plurality of systems, and a received signal that is output from the single receiving weight multiplication unit 23 has a plurality of systems. Since the number of input systems is increased, matrix sizes of a transmitting weight and a receiving weight differ, and processing methods in the transmitting weight multiplication unit 13 and the receiving weight multiplication unit 23 differ. Consequently, there is a difference from Example 1 in that, among OAM modes, an OAM mode having a high signal-to-interference-plus-noise ratio (SINR) is selected and used, a throughput is improved while compensating for interference due to a tilt, axis deviation, or multipaths.

The I-th transmitting weight multiplication unit 13-I receives $M_I$ parallel modulated signals $s_I$, and outputs modulated signals $s'_I$ obtained by multiplying the respective modulated signals by the transmitting weight $V_I$.

$$s_I = (s_{I,1}, \ldots, s_{I,M_I})^T \in \mathbb{C}^{M_I \times 1}$$

$$V_I \in \mathbb{C}^{M_{TX} \times M_I}$$

$$s'_I \triangleq V_I s_I = (S_I[1], \ldots, s_I[M_{TX}])^T$$

The I-th receiving weight multiplication unit 23-I receives outputs $(r_1[I], \ldots, r_{M_{RX}}[I])^T$ from the first receiving OAM mode demultiplex unit 22-1 to the $M_{RX}$-th receiving OAM mode demultiplex unit 22-$M_{RX}$, and outputs received signals $r_I$ obtained by multiplying the outputs by the receiving weight $U_I$.

$$U_I \in \mathbb{C}^{M_I \times M_{RX}}$$

$$r_I \triangleq (r_{I,1}, \ldots, r_{I,M_I})^T = U_I(r_1[I], \ldots, r_{M_{RX}}[I])^T$$

When the transmitting antenna and the receiving antenna are not provided in an ideal open environment and are not disposed to face each other, the received signal vector $r_I$ is given as follows.

$$r_I = U_I A_I V_I s_I + U_I \left( \sum_{k \neq I} A_{I,k} V_k s_k \right) \quad (9)$$

The second term in Equation (9) is an interference component.

Hereinafter, a description will be made of a method of determining the transmitting weight $V_I$ and the receiving weight $U_I$ in Example 2. The received signal in Equation (9) may be rewritten as follows by using the singular value decomposition result in Equation (6).

$$r_I = U_I A_I V_I s_I + U_I \left( \sum_{m=1}^{M_{RX}} \sigma_m u_{I,m} v_{I,m}^H \right) \begin{pmatrix} V_1 s_1 \\ \vdots \\ V_{I-1} s_{I-1} \\ V_{I+1} s_{I+1} \\ \vdots \\ V_L s_L \end{pmatrix}$$

It is noted that the left singular vector $(u^H_{I,M_{RX}-(M_I-1)}, \ldots, u^H_{I,M_{RX}-1}, u^H_{I,M_{RX}})$ is multiplied by a vector $(r'_I[I], \ldots, r'_{M_{RX}}[I])^T$ in which I-th sequences output from the first receiving OAM mode demultiplex unit 22-1 to the $M_{RX}$-th receiving OAM mode demultiplex unit 22-$M_{RX}$ are arranged, and thus some interference components are eliminated.

$$(u^H_{I,M_{RX}-(M_I-1)}, \ldots, u^H_{I,M_{RX}-1}, u^H_{I,M_{RX}})(r_1[I], \ldots, r_{M_{RX}}[I])^T =$$

$$(u^H_{I,M_{RX}-(M_I-1)}, \ldots, u^H_{I,M_{RX}-1}, u^H_{I,M_{RX}}) A_I V_I s_I +$$

$$(u^H_{I,M_{RX}-(M_I-1)}, \ldots, u^H_{I,M_{RX}-1}, u^H_{I,M_{RX}}) \left( \sum_{m=1}^{M_{RX}} \sigma_m u_{I,m} v_{I,m}^H \right) \begin{pmatrix} V_1 s_1 \\ \vdots \\ V_{I-1} s_{I-1} \\ V_{I+1} s_{I+1} \\ \vdots \\ V_L s_L \end{pmatrix} =$$

$$(u^H_{I,M_{RX}-(M_I-1)}, \ldots, u^H_{I,M_{RX}-1}, u^H_{I,M_{RX}}) A_I V_I s_I +$$

$$\left( \sum_{m=M_{RX}-(M_I-1)}^{M_{RX}} \sigma_m v_{I,m}^H \right) \begin{pmatrix} V_1 s_1 \\ \vdots \\ V_{I-1} s_{I-1} \\ V_{I+1} s_{I+1} \\ \vdots \\ V_L s_L \end{pmatrix}$$

$$\because u^H_{I,m} u_{I,n} = 0, \text{ if } n \neq m$$

In other words, $(u^H_{I,M_{RX}-(M_I-1)}, \ldots, u^H_{I,M_{RX}-1}, u^H_{I,M_{RX}})$ is multiplied, and thus a vector space including a main interference component can be eliminated. Next, a transmitting weight and a receiving weight are determined by using a singular vector obtained by subjecting the matrix $(u^H_{I,M_{RX}-(M_I-1)}, \ldots, u^H_{I,M_{RX}-1}, u^H_{I,M_{RX}}) A_I$ of the main signal component to singular value decomposition. Consequently, eigenmode transmission can be performed while reducing inter-mode interference. A singular value decomposition result of the identical matrix is as follows.

$$(u^H_{I,M_{RX}-(M_I-1)}, \ldots, u^H_{I,M_{RX}-1}, u^H_{I,M_{RX}}) A_I = \quad (10)$$

$$(\theta_I^{(img)}, \theta_I^{(ker)}) \begin{bmatrix} \mu_{I,1} & & 0 \\ & \ddots & & O_{M_I \times M_{TX}} \\ 0 & & \mu_{I,M_I} \end{bmatrix} (\phi_I^{(img)}, \phi_I^{(ker)})^H$$

Here, $\Theta_I^{(img)}$ and $\Theta_I^{(ker)}$ are respectively a left singular vector corresponding to nonzero singular values of $(u^H_{I,M_{RX}-(M_I-1)}, \ldots, u^H_{I,M_{RX}-1}, u^H_{I,M_{RX}}) A_I$ and a left singular vector corresponding to zero singular values thereof, and $\Phi_I^{(img)}$ and $\Phi_I^{(ker)}$ are respectively a right singular vector corresponding to nonzero singular values of the identical matrix and a right singular vector corresponding to zero singular values thereof. The transmitting weight $V_I$ and the receiving weight $U_I$ are determined as in Equation (11) based on the singular value decomposition result represented in Equation (10).

$$V_I = \Phi_I^{(img)}$$

$$U_I = (\theta_I^{(img)})^H (u_{I,M_{RX}-(M_I-1)}^H, \ldots, u_{I,M_{RX}-1}^H, u_{I,M_{RX}}^H) \quad (11)$$

In this case, the received signal n is output as a signal in which interference is suppressed as follows.

$$r_l = U_l A_l V_l s_l + U_l \left( \sum_{m=1}^{M_{RR}-M_l} \sigma_m u_{l,m} v_{l,m}^H \right) \begin{pmatrix} V_1 s_1 \\ \vdots \\ V_{l-1} s_{l-1} \\ V_{l+1} s_{l+1} \\ \vdots \\ V_L s_L \end{pmatrix}$$

$$= (\theta_l^{(img)})^H (u_{l,M_{RX}-(M_l-1)}^H, \ldots, u_{l,M_{RX}-1}^H, u_{l,M_{RX}}^H) A_l \phi_l^{(img)} s_l$$

$$+ (\theta_l^{(img)})^H (u_{l,M_{RX}-(M_l-1)}^H, \ldots, u_{l,M_{RX}-1}^H, u_{l,M_{RX}}^H) \left( \sum_{m=1}^{M_{RX}-M_l} \sigma_m u_{l,m} v_{l,m}^H \right) \begin{pmatrix} V_1 s_1 \\ \vdots \\ V_{l-1} s_{l-1} \\ V_{l+1} s_{l+1} \\ \vdots \\ V_L s_L \end{pmatrix}$$

$$= \text{diag}(\mu_{l,1}, \ldots, \mu_{l,M_k}) s_l + (\theta_l^{(img)})^H \left( \sum_{m=M_{RX}-(M_l-1)}^{M_{RX}} \sigma_m v_{l,m}^H \right) \begin{pmatrix} V_1 s_1 \\ \vdots \\ V_{l-1} s_{l-1} \\ V_{l+1} s_{l+1} \\ \vdots \\ V_L s_L \end{pmatrix}$$

$$\approx \text{diag}(\mu_{l,1}, \ldots, \mu_{l,M_l}) s_l$$

The multiplex number $M_I$ may be determined based on a selection standard depending on a total capacity computed according to an SINR or the like, and may be determined based on other selection standards. Alternatively, the multiplex number $M_I$ may be a fixed value determined in advance by a system.

Figure 7:
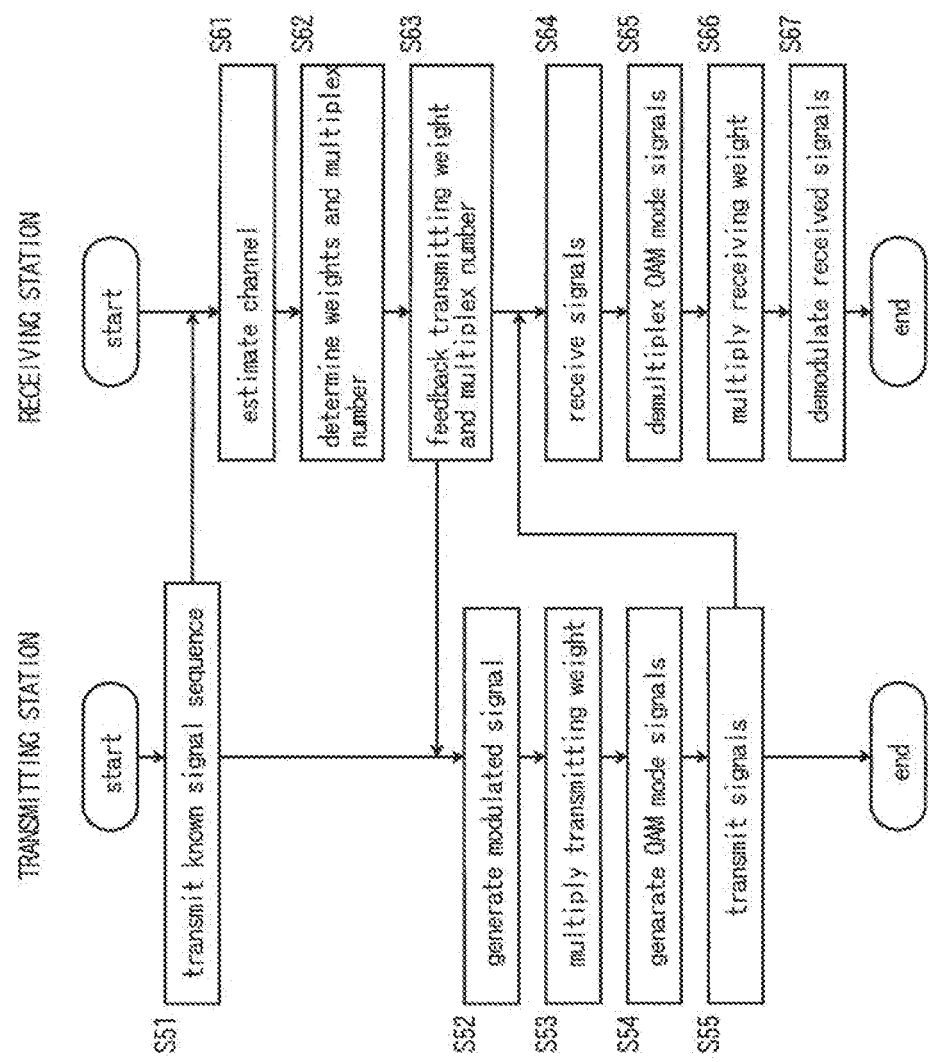
FIG. 7 is a flowchart illustrating process procedures in Example 2 of the OAM multiplexing communication system of the present invention.

FIG. 7 illustrates process procedures in Example 2 of the OAM multiplexing communication system of the present invention. In FIG. 7, the reference signal transmission unit 16 of the transmitting station transmits a known signal sequence (S51).

When the receiving station receives the known signal sequence is received, the channel state acquisition unit 26 estimates responses $\Lambda I$ and $\Lambda_{I,k}$ for each channel based on the known signal sequence (S61). Next, the weight calculation unit 27 performs singular value decomposition represented in Equation (9) based on the estimated responses $\Lambda_I$ and $\Lambda_{I,k}$ for the channel, determines the transmitting weight $V_I$ and the receiving weight $U_I$ as in Equation (10) and also determines the multiplex number $M_I$, and sets the receiving weight $U_I$ in each receiving weight multiplication unit 23 (S62). The multiplex number $M_I$ may be a value set in advance, and may be an adaptively selected value. The feedback unit 28 sets the multiplex number $M_I$ determined by the weight calculation unit 27 in the S/P conversion/signal processing unit 12 of the transmitting station, and sets the transmitting weight $V_I$ in each transmitting weight multiplication unit 13 of the transmitting station (S63).

In the transmitting station, the S/P conversion/signal processing unit 12 in which the multiplex number $M_I$ is set generates a modulated signal (S52). Next, each transmitting weight multiplication unit 13 multiplies the generated modulated signal by the transmitting weight $V_I$ (S53). The transmitting OAM mode generation unit 14 performs an OAM mode generation process on the modulated signal multiplied by the transmitting weight $V_I$ according to DFT calculation (S54), and signals in respective OAM modes are respectively transmitted from the transmitting UCAs 15 of the transmitting station (S55).

The respective receiving UCAs 21 of the receiving station receive the signals transmitted from the transmitting station (S64), and the receiving OAM mode demultiplex units 22 perform an OAM mode demultiplex process on the signals according to IDFT calculation (S65). Next, each receiving weight multiplication unit 23 multiplies the received signals in the respective OAM modes by the receiving weight $U_I$ (S66). The signal processing/P/S conversion unit 25 demodulates the received signals in which inter-mode interference is suppressed through the above processes, to be converted into bit strings, and arranges the bit strings into an original information bit string through P/S conversion, and outputs the information bit string (S67).

Modification of Example 2

Figure 8:
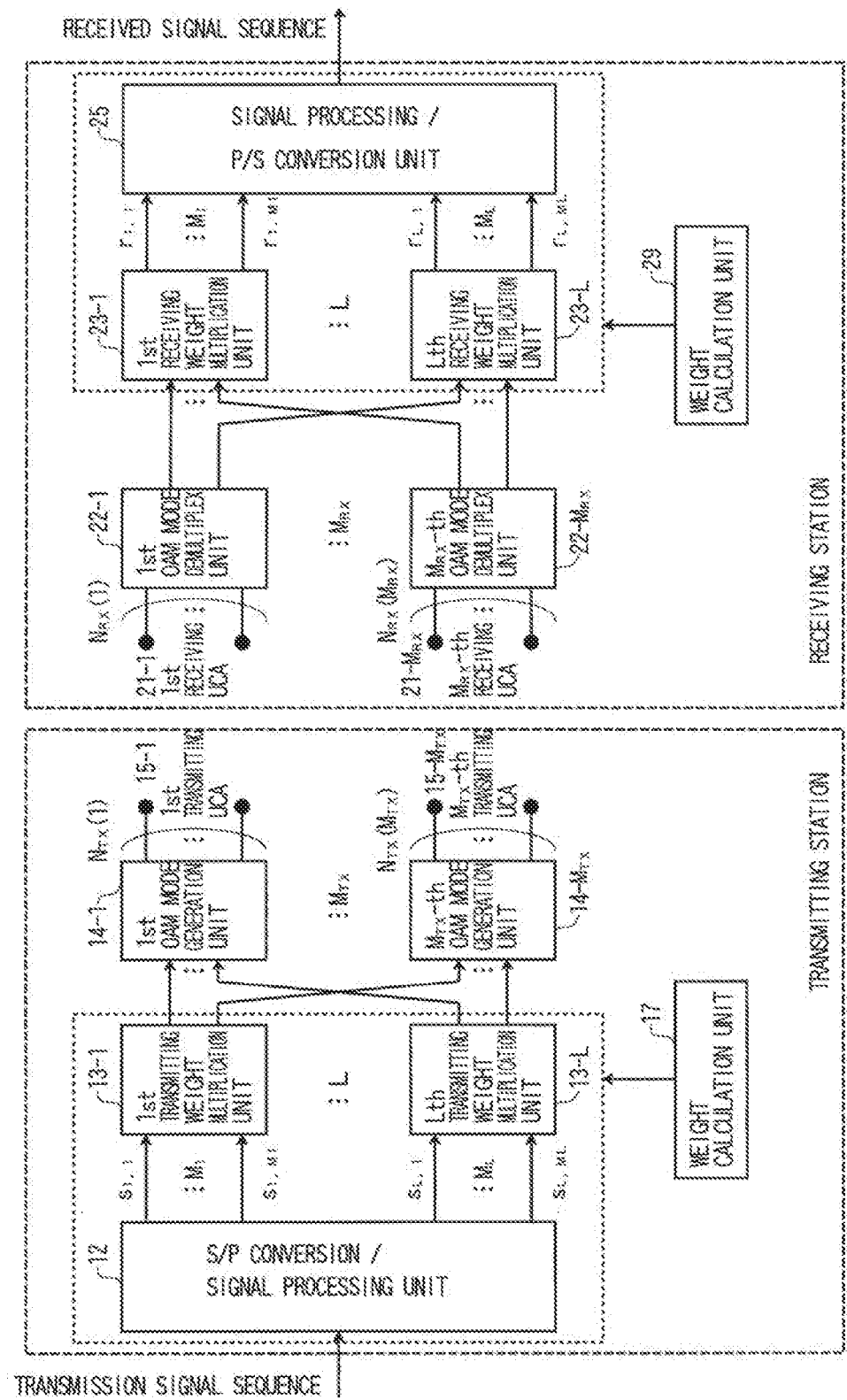
FIG. 8 is a diagram illustrating a modified configuration of Example 2 of the OAM multiplexing communication system of the present invention.
Figure 9:
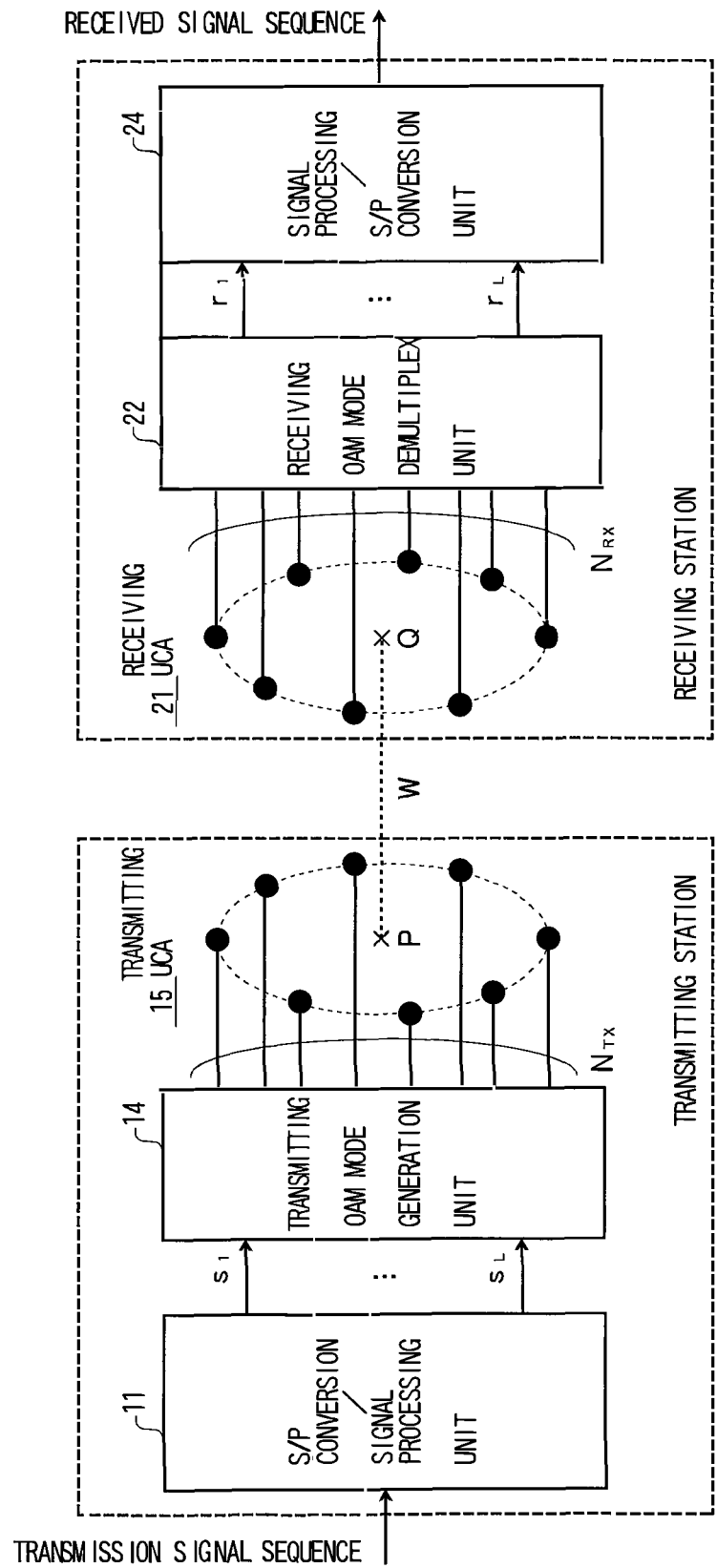
FIG. 9 is a diagram illustrating a configuration example of an OAM multiplexing communication system of the related art.

FIG. 8 illustrates a modified configuration of Example 2 of the OAM multiplexing communication system of the present invention. In FIG. 8, a transmitting station includes an S/P conversion/signal processing unit 12, L transmitting weight multiplication units such as a first transmitting weight multiplication unit 13-1 to an L-th transmitting weight multiplication unit 13-L, $M_{TX}$ transmitting OAM mode generation units such as a first transmitting OAM mode generation unit 14-1 to an $M_{TX}$-th transmitting OAM mode generation unit 14-$M_{TX}$ respectively corresponding to $M_{TX}$ transmitting UCAs 15-1 to 15-$M_{TX}$, and a weight calculation unit 17.

A receiving station includes $M_{RX}$ receiving OAM mode demultiplex units such as a first receiving OAM mode demultiplex unit 22-1 to an $M_{RX}$-th receiving OAM mode demultiplex unit 22-$M_{RX}$ respectively corresponding to $M_{RX}$ receiving UCAs 21-1 to 21-$M_{RX}$, L receiving weight multiplication units such as a first receiving weight multiplication unit 23-1 to an L-th receiving weight multiplication unit 23-L, a signal processing/P/S conversion unit 25 receiving $M_1$ to $M_L$ received signals, and a weight calculation unit 29.

A difference from Example 2 illustrated in FIG. 6 is that the receiving station does not perform channel estimation, and the transmitting station and the receiving station separately determine a transmitting weight and a receiving weight. In other words, in the configuration illustrated in FIG. 8, a channel response is estimated in advance in the transmitting station and the receiving station, an estimated value is held in the weight calculation unit 17 of the transmitting station and the weight calculation unit 29 of the receiving station, the weight calculation units 17 and 29 determine a transmitting weight and a receiving weight based on the channel response, and set the weights in the transmitting weight multiplication unit 13 and the receiving weight multiplication unit 23. The multiplex number $M_I$ is determined in advance, and the transmitting station and the receiving station have the information regarding the multiplex number $M_I$ together, and can thus perform communication without performing a feedback process.

Process procedures in the modified configuration of Example 2 of the OAM multiplexing communication system of the present invention are the same as the process procedures in the modified configuration of Example 1 illustrated in FIG. 5 except that the S/P conversion/signal processing unit 12 of the transmitting station generates modulated signals corresponding to the multiplex number $M_I$, and the signal processing/P/S conversion unit 25 of the receiving station demodulates received signals corresponding to the multiplex number $M_I$.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An OAM multiplexing communication system that subjects a plurality of transmission signal sequences to spatial multiplex transmission by using an orbital angular momentum (OAM) mode of an electromagnetic wave, the OAM multiplexing communication system comprising:
a transmitting station including a transmitting antenna using an M-UCA formed of a plurality of $M_{TX}$ uniform circular arrays (UCAs) that are concentrically disposed at an equal interval and have different diameters, each of the UCAs having a plurality of antenna elements disposed circularly at an equal interval; and
a receiving station including a receiving antenna using an M-UCA formed of a plurality of $M_{RX}$ UCAs in the same manner as the transmitting station, wherein:
the transmitting station includes
a plurality of transmitting weight multiplication units each inputting the plurality of transmission signal sequences and multiplying each of the transmission signal sequences by a transmitting weight, to be converted into $M_{TX}$ signals corresponding to the UCAs forming the M-UCA so as to output the converted signals, and
$M_{TX}$ transmitting OAM mode generation units inputting the signals corresponding to the UCAs output from each of the plurality of transmitting weight multiplication units and performing discrete Fourier transform on the input signals, so as to output to the corresponding UCAs; and
the receiving station includes
$M_{RX}$ receiving OAM mode demultiplex units inputting signals from each of the UCAs forming the M-UCA and performing inverse Fourier transform on the input signals, so as to output by each of received signal sequences, and
a plurality of receiving weight multiplication units multiplying for each of the received signal sequences output from the receiving OAM mode demultiplex units by a receiving weight, so as to demultiplex the received signal sequences subjected to spatial multiplex transmission and to output the received signal sequence in which interference between spatially multiplexed OAM modes is suppressed.

2. The OAM multiplexing communication system according to claim 1, wherein:
the transmitting weight multiplication units are configured to receive the plurality of transmission signal sequences and to multiply the transmission signal sequences by the transmitting weight; and
the receiving weight multiplication units are configured to demultiplex the plurality of received signal sequences subjected to the spatial multiplex transmission.

3. The OAM multiplexing communication system according to claim 1 or 2, further comprising
a weight calculation unit performing channel estimation based on output values from the receiving OAM mode demultiplex units for a known signal sequence transmitted from the transmitting station to the receiving station, and determining the transmitting weight and the receiving weight, wherein
the receiving weight is configured to set in the receiving weight multiplication units, and the transmitting weight is configured to feed back to the transmitting station from the receiving station to be set in the transmitting weight multiplication units, so that an interference component between OAM modes subjected to the spatial multiplex transmission is suppressed.

4. An inter-mode interference elimination method for an OAM multiplexing communication system that subjects a plurality of transmission signal sequences to spatial multiplex transmission by using an orbital angular momentum (OAM) mode of an electromagnetic wave; that includes a transmitting station including a transmitting antenna using an M-UCA formed of a plurality of $M_{TX}$ uniform circular arrays (UCAs) that are concentrically disposed at an equal interval and have different diameters, each of the UCAs having a plurality of antenna elements disposed circularly at an equal interval; and that includes a receiving station including a receiving antenna using an M-UCA formed of a plurality of $M_{RX}$ UCAs in the same manner as the transmitting station, the inter-mode interference elimination method comprising:
causing a plurality of transmitting weight multiplication units of the transmitting station each to input the plurality of transmission signal sequences and to multiply each of the transmission signal sequences by a transmitting weight, to be converted into $M_{TX}$ signals corresponding to the UCAs forming the M-UCA so as to output the converted signals;

causing $M_{TX}$ transmitting OAM mode generation units of the transmitting station to input the signals corresponding to the UCAs output from each of the plurality of transmitting weight multiplication units and to perform discrete Fourier transform on the input signals, so as to output to the corresponding UCAs;

causing $M_{RX}$ receiving OAM mode demultiplex units of the receiving station to input signals from each of the UCAs forming the M-UCA and to perform inverse Fourier transform on the input signals, so as to output by each of received signal sequences; and causing a plurality of receiving weight multiplication units of the receiving station to multiply for each of the received signal sequences output from the receiving OAM mode demultiplex units by a receiving weight so as to demultiplex the received signal sequence subjected to spatial multiplex transmission and to output the received signal sequence in which interference between spatially multiplexed OAM modes is suppressed.

5. The inter-mode interference elimination method for an OAM multiplexing communication system according to claim 4, wherein:

channel estimation is performed based on output values from the receiving OAM mode demultiplex units for a known signal sequence transmitted from the transmitting station to the receiving station, and the transmitting weight and the receiving weight are determined; and the receiving weight is set in the receiving weight multiplication units, and the transmitting weight is fed back to the transmitting station from the receiving station to be set in the transmitting weight multiplication units, so that an interference component between OAM modes subjected to spatial multiplex transmission is suppressed.

6. The inter-mode interference elimination method for an OAM multiplexing communication system according to claim 5, wherein the transmitting weight and the receiving weight for suppressing interference between spatially multiplexed signals are determined based on a result of singular value decomposition on a matrix representing interference components from other discrete frequency components remaining in a specific discrete frequency component, and a result of singular value decomposition on a matrix representing a self-discrete frequency component, in outputs from the receiving OAM mode demultiplex units.

7. The inter-mode interference elimination method for an OAM multiplexing communication system according to claim 5, wherein a weight including a vector orthogonal to one or more vectors among vectors included in left singular vectors is set as the receiving weight, the left singular vectors are a result of singular value decomposition on a matrix representing interference components from other discrete frequency components in outputs from the receiving OAM mode demultiplex units.

8. The inter-mode interference elimination method for an OAM multiplexing communication system according to claim 5, wherein the transmitting weight and the receiving weight are determined based on singular value decomposition on a multiplication result between a vector orthogonal to a vector included in left singular vectors and a matrix representing a self-discrete frequency component, the left singular vectors are a result of singular value decomposition on a matrix representing interference components from other discrete frequency components in outputs from the receiving OAM mode demultiplex units.

9. The inter-mode interference elimination method for an OAM multiplexing communication system according to claim 4, wherein a multiplex number of spatially multiplexed signals is determined based on a standard in which a total rate corresponding to a received signal quality is the maximum, or is determined in advance.

* * * * *